(12) United States Patent
Zhang et al.

(10) Patent No.: US 12,217,094 B1
(45) Date of Patent: Feb. 4, 2025

(54) METHOD OF RESOURCE ADJUSTMENT FOR SERVICE CLUSTER, ELECTRONIC DEVICE AND STORAGE MEDIUM

(71) Applicants: National University of Singapore, Singapore (SG); Beijing Volcano Engine Technology Co., Ltd., Beijing (CN)

(72) Inventors: Yifan Zhang, Beijing (CN); Zhanghao Chen, Beijing (CN); Meng Wang, Beijing (CN); Guanghui Zhang, Beijing (CN); Yong Fang, Beijing (CN); Rui Shi, Beijing (CN); Tianbai Ma, Singapore (SG); Yancan Mao, Singapore (SG)

(73) Assignees: Beijing Volcano Engine Technology Co., Ltd., Beijing (CN); National University of Singapore, Singapore (SG)

( * ) Notice: Subject to any disclaimer, the term of this patent is extended or adjusted under 35 U.S.C. 154(b) by 0 days.

(21) Appl. No.: 18/749,020

(22) Filed: Jun. 20, 2024

(30) Foreign Application Priority Data

Jul. 31, 2023 (CN) .......................... 202310956835.3

(51) Int. Cl.
*G06F 9/46* (2006.01)
*G06F 9/50* (2006.01)

(52) U.S. Cl.
CPC .......... *G06F 9/5038* (2013.01); *G06F 9/5083* (2013.01)

(58) Field of Classification Search
CPC ............................ G06F 9/5038; G06F 9/5083
See application file for complete search history.

(56) References Cited

FOREIGN PATENT DOCUMENTS

CN 115129484 B 11/2022

*Primary Examiner* — Gregory A Kessler

(57) ABSTRACT

The present disclosure provides a method and an apparatus of resource adjustment for a service cluster, an electronic device and a storage medium. The method includes: determining resource adjustment information for the service cluster according to a task quantity of streaming data processing tasks to be processed; determining a core quantity to be adjusted corresponding to central processor units and the second quantity of computing nodes to be adjusted, according to the parallelism degree to be adjusted, the first quantity of the computing nodes that have been created in the service cluster, and a resource utilization rate of central processor units in each computing node that has been created; and executing the resource adjustment operation according to the core quantity to be adjusted and the second quantity, and obtaining a service cluster subject to resource adjusting.

20 Claims, 3 Drawing Sheets

Determining resource adjustment information for a service cluster according to a task quantity of streaming data processing tasks to be processed, wherein the resource adjustment information includes a resource adjustment operation that is required to be executed for processing the streaming data processing tasks and a corresponding parallelism degree to be adjusted, and the parallelism degree to be adjusted is used to indicate a resource quantity that is required to be adjusted by the service cluster — S101

Determining a core quantity to be adjusted corresponding to central processor units and the second quantity of computing nodes to be adjusted, according to the parallelism degree to be adjusted, the first quantity of the computing nodes that have been created in the service cluster, and a resource utilization rate of central processor units in each computing node that has been created — S102

Executing the resource adjustment operation according to the core quantity to be adjusted and the second quantity, and obtaining the service cluster subject to resource adjusting, wherein the service cluster subject to resource adjusting is used to process streaming data processing tasks under the task quantity — S103

Determining resource adjustment information for a service cluster according to a task quantity of streaming data processing tasks to be processed, wherein the resource adjustment information includes a resource adjustment operation that is required to be executed for processing the streaming data processing tasks and a corresponding parallelism degree to be adjusted, and the parallelism degree to be adjusted is used to indicate a resource quantity that is required to be adjusted by the service cluster ⸺ S101

Determining a core quantity to be adjusted corresponding to central processor units and the second quantity of computing nodes to be adjusted, according to the parallelism degree to be adjusted, the first quantity of the computing nodes that have been created in the service cluster, and a resource utilization rate of central processor units in each computing node that has been created ⸺ S102

Executing the resource adjustment operation according to the core quantity to be adjusted and the second quantity, and obtaining the service cluster subject to resource adjusting, wherein the service cluster subject to resource adjusting is used to process streaming data processing tasks under the task quantity ⸺ S103

Fig. 1

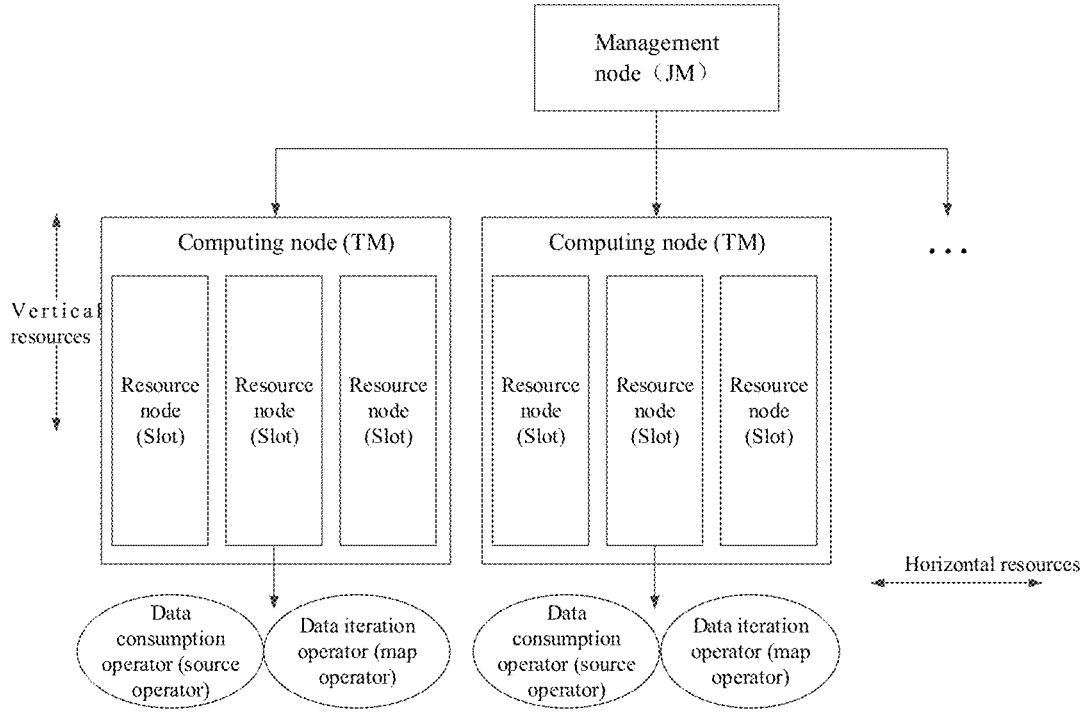

Fig. 2

METHOD OF RESOURCE ADJUSTMENT FOR SERVICE CLUSTER, ELECTRONIC DEVICE AND STORAGE MEDIUM

CROSS-REFERENCE TO RELATED APPLICATION(S)

The present application claims priority of the Chinese Patent Application No. 202310956835.3, filed on Jul. 31, 2023, the disclosure of which is incorporated herein by reference in its entirety as part of the present application.

TECHNICAL FIELD

The present disclosure relates to the field of the computer technology, and specifically, to a method of resource adjustment for a service cluster, an apparatus of resource adjustment for a service cluster, an electronic device and a storage medium.

BACKGROUND

In a streaming data processing scenario, continuous streaming data often occur, and in order to conduct the processing on streaming data, an Flink engine is required to be used to execute kinds of streaming data processing tasks. Different types of streaming data processing tasks may always correspond to different data processing requirements. For each type of streaming data processing tasks, computing nodes deployed in one or more service clusters can be used to conduct processing, and the computing nodes in each service cluster can be managed by using the management nodes of the Flink engine deployed for the service cluster.

Regardless of any type of streaming data processing tasks, the resources in the service cluster used to execute the task have been assigned before executing the task. However, the streaming data often has traffic instability, and there may be an increase in task traffic sometimes and a decrease in task traffic sometimes. To ensure that tasks can run stably for a long time, the resources in the service cluster are required for an adaptive adjustment, i.e., the service cluster is required for auto-scaling. However, after executing auto-scaling, the conventional auto-scaling scheme may increase the instability of tasks or decrease the resource utilization rate and result in the problem of unreasonable resource scaling.

SUMMARY

Embodiments of the present disclosure at least provide a method of resource adjustment for a service cluster, an apparatus of resource adjustment for a service cluster, an electronic device and a storage medium.

At least one embodiment of the present disclosure provides a method of resource adjustment for a service cluster, which includes:
  determining resource adjustment information for the service cluster according to a task quantity of streaming data processing tasks to be processed, wherein the resource adjustment information includes a resource adjustment operation that is required to be executed for processing the streaming data processing tasks and a corresponding parallelism degree to be adjusted; the parallelism degree to be adjusted is used to indicate a resource quantity that is required to be adjusted by the service cluster;
  determining a core quantity to be adjusted corresponding to central processor units and the second quantity of computing nodes to be adjusted, according to the parallelism degree to be adjusted, the first quantity of the computing nodes that have been created in the service cluster, and a resource utilization rate of central processor units in each computing node that has been created; and
  executing the resource adjustment operation according to the core quantity to be adjusted and the second quantity, and obtaining a service cluster subject to resource adjusting, wherein the service cluster subject to resource adjusting is used to process streaming data processing tasks under the task quantity.

In an alternative embodiment, in the case where the resource adjustment operation includes a resource scaling-out operation, the core quantity to be adjusted includes a core quantity to be increased, and the computing nodes to be adjusted include computing nodes to be increased;
  the determining a core quantity to be adjusted corresponding to central processor units and the second quantity of computing nodes to be adjusted, according to the parallelism degree to be adjusted, the first quantity of the computing nodes that have been created in the service cluster, and the resource utilization rate of the central processor units in each computing node that has been created, includes:
  determining the core quantity to be adjusted of the central processor units, according to the resource utilization rate, an initial core quantity of the central processor units and a node quantity of resource nodes in the computing nodes that have been created;
  determining a conversion parallelism degree corresponding to the core quantity to be increased according to the core quantity to be increased and the first quantity; the conversion parallelism degree being used to characterize a parallelism degree that is equivalently increased based on the total original parallelism degree corresponding to the service cluster, after respectively adding the core quantity to be increased to the central processor units in each computing node that has been created; and
  in the case where the conversion parallelism degree is less than the parallelism degree to be adjusted, determining the second quantity of the computing nodes to be increased according to the conversion parallelism degree, the parallelism degree to be adjusted, and the node quantity.

In an alternative embodiment, the determining the core quantity to be adjusted of the central processor units, according to the resource utilization rate, the initial core quantity of the central processor units and the node quantity of resource nodes in the computing nodes that have been created, includes:
  in the case where the initial core quantity is less than a preset core quantity threshold value, determining whether a target resource utilization rate that is larger than the first preset threshold value exists in each resource utilization rate;
  in response to the target resource utilization rate that is larger than the first preset threshold value existing in each resource utilization rate, determining a target core quantity according to the target resource utilization rate, the initial core quantity and the second preset threshold value; and
  determining the core quantity to be increased according to a minimum value of the target core quantity, the node quantity and the preset core quantity threshold value, and the initial core quantity.

In an alternative embodiment, the determining a conversion parallelism degree corresponding to the core quantity to be increased according to the core quantity to be increased and the first quantity, includes:
  determining a total increased core quantity according to the core quantity to be adjusted and the first quantity; and
  determining the conversion parallelism degree according to the node quantity and a ratio of the total increased core quantity to the initial core quantity.

In an alternative embodiment, the determining the second quantity of the computing nodes to be increased according to the conversion parallelism degree, the parallelism degree to be adjusted and the node quantity, includes:
  determining a difference parallelism degree between the parallelism degree to be adjusted and the conversion parallelism degree; and
  in the case where the difference parallelism degree is larger than a target threshold value, determining the second quantity of the computing nodes to be increased according to a ratio of the difference parallelism degree to the node quantity.

In an alternative embodiment, in the case where the resource adjustment operation includes a resource reduction operation, the core quantity to be adjusted includes a core quantity to be reduced, and the computing nodes to be adjusted include computing nodes to be reduced;
  the determining a core quantity to be adjusted corresponding to central processor units and the second quantity of computing nodes to be adjusted, according to the parallelism degree to be adjusted, the first quantity of the computing nodes that have been created in the service cluster, and the resource utilization rate of the central processor units in each computing node that has been created, includes:
  in the case where the first quantity is larger than a preset quantity, determining the second quantity of the computing nodes to be reduced, according to the parallelism degree to be adjusted and a node quantity of resource nodes in the computing nodes that have been created;
  in the case where a difference value between the second quantity of the computing nodes to be reduced and the first quantity is equal to the preset quantity, determining whether the resource utilization rate of the computing nodes that have been created of the preset quantity is less than the third preset threshold value; and
  in response to the resource utilization rate of the computing nodes that have been created of the preset quantity being less than the third preset threshold value, determining the core quantity to be reduced of the central processor units according to the resource utilization rate, the initial core quantity of the central processor unit, and the second preset threshold value.

In an alternative embodiment, the determining resource adjustment information for the service cluster according to a task quantity of streaming data processing tasks to be processed, includes:
  determining a target parallelism degree corresponding to the streaming data processing tasks according to the task quantity;
  determining a total original parallelism degree corresponding to the service cluster, according to the first quantity and a node quantity of resource nodes in the computing nodes that have been created; and
  determining the resource adjustment operation and the parallelism degree to be adjusted, according to a difference value between the target parallelism degree and the total original parallelism degree.

At least one embodiment of the present disclosure further provides an apparatus of resource adjustment for a service cluster, which includes the first determining module, the second determining module and an adjustment module.

The first determining module is configured to determine resource adjustment information for the service cluster according to a task quantity of streaming data processing tasks to be processed. The resource adjustment information includes a resource adjustment operation that is required to be executed for processing the streaming data processing tasks and a corresponding parallelism degree to be adjusted. The parallelism degree to be adjusted is used to indicate a resource quantity that is required to be adjusted by the service cluster.

The second determining module is configured to determine a core quantity to be adjusted corresponding to central processor units and the second quantity of computing nodes to be adjusted, according to the parallelism degree to be adjusted, the first quantity of the computing nodes that have been created in the service cluster, and a resource utilization rate of central processor units in each computing node that has been created.

The adjustment module is configured to execute the resource adjustment operation according to the core quantity to be adjusted and the second quantity, and obtain a service cluster subject to resource adjusting, wherein the service cluster subject to resource adjusting is used to process streaming data processing tasks under the task quantity.

At least one embodiment of the present disclosure further provides an electronic device, which includes a processor and a memory. The memory stores machine-readable instructions executed by the processor. The processor is configured to execute the machine-readable instructions stored in the memory. When the machine-readable instructions are executed by the processor, the processor executes steps in any of the above-mentioned embodiments, or the steps of any possible implementation in any of the above-mentioned embodiments.

At least one embodiment of the present disclosure further provides a non-transient computer-readable storage medium. The non-transient computer-readable storage medium stores computer programs, and when the computer programs are run by an electronic device, the electronic device executes steps in any of the above-mentioned embodiments, or the steps of any possible implementation in any of the above-mentioned embodiments.

For the description of the effects of the above-mentioned apparatus of resource adjustment for a service cluster, electronic device, and computer-readable storage medium, the description of the above-mentioned method of resource adjustment for a service cluster can be referred to, and will not be repeated here.

BRIEF DESCRIPTION OF DRAWINGS

In order to more clearly illustrate the technical solutions of the embodiments of the present disclosure, the drawings required to be used in the embodiments are briefly described below, and the drawings herein are incorporated into the description and form part of the present description, which show the embodiments that conform to the present disclosure and are used together with the description to illustrate the technical solutions of the present disclosure. It should be understood that the following drawings only show some embodiments of the present disclosure and should not be regarded as limiting the scope, and that other relevant drawings may be obtained from those drawings without creative effort on the premise that a person of ordinary skill in the art is employed.

FIG. 1 illustrates a flowchart of a method of resource adjustment for a service cluster provided in an embodiment of the present disclosure;

FIG. 2 illustrates a structural schematic diagram of the management node, the computing node and the resource node in a service cluster provided in an embodiment of the present disclosure;

DETAILED DESCRIPTION

Figure 3:
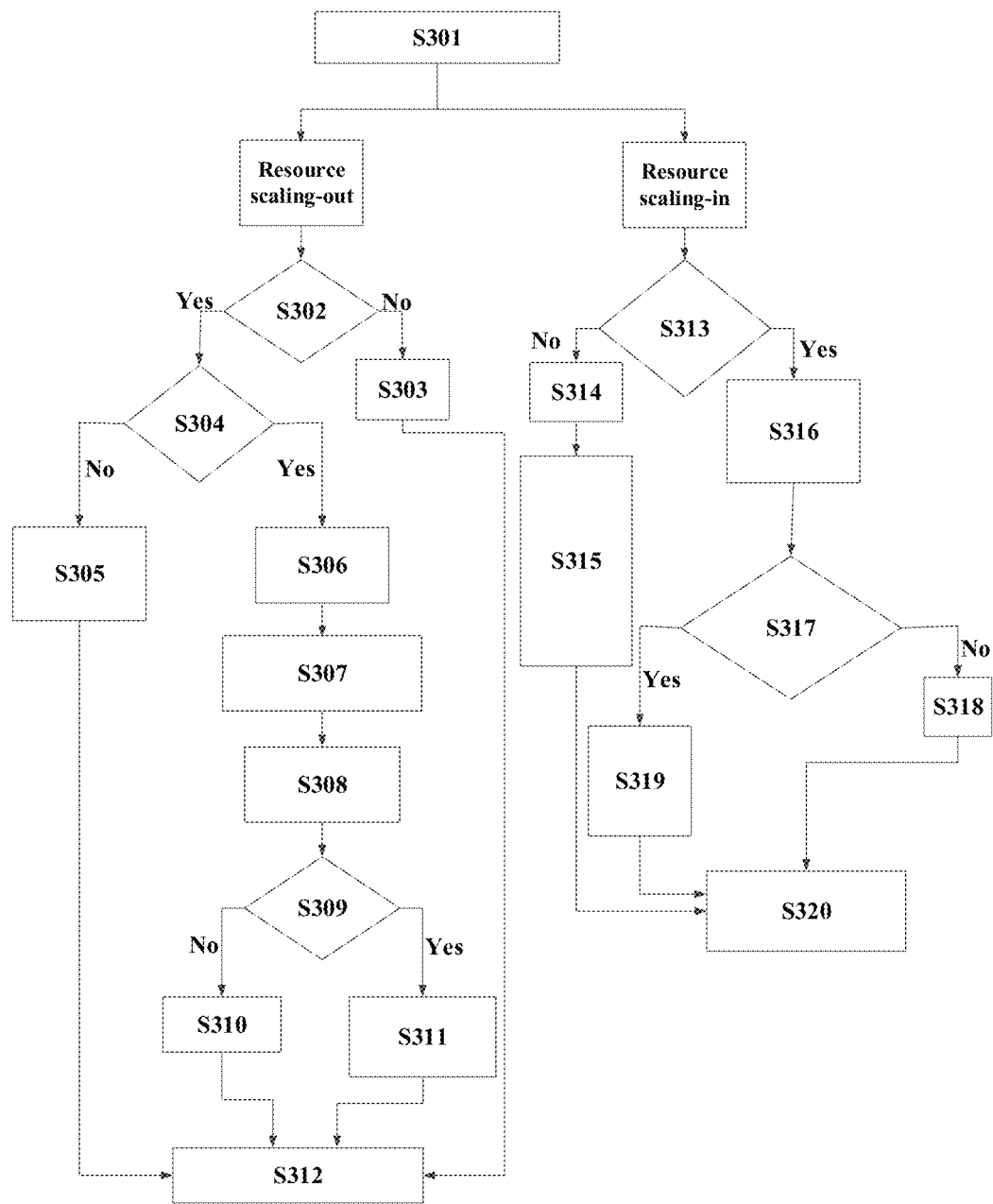
FIG. 3 illustrates a specific implementation flowchart of a method of resource adjustment for a service cluster provided in an embodiment of the present disclosure.

In order to make the purpose, technical solution and advantages of the embodiments of the present disclosure clearer, the technical solutions in the embodiments of the present disclosure will be clearly and completely described below in conjunction with the accompanying drawings in the embodiments of the present disclosure, and it is obvious that the embodiments described are only part of the embodiments of the present disclosure, not all embodiments. The components of the present disclosed embodiment, which is typically described and shown here, may be laid out and designed in a variety of different configurations. Therefore, the following detailed description of the embodiments of the present disclosure is not intended to limit the scope of the claimed disclosure, but merely indicates the selected embodiments of the present disclosure. Based on the embodiments of the present disclosure, all other embodiments obtained by a person skilled in the art without creative work fall within the scope of protection of the present disclosure.

In addition, the terms "first", "second", etc., in the description and claims in the present embodiment and in the above-mentioned drawings are used to distinguish similar objects, and do not need to be used to describe a specific order or sequence. It should be understood that the data thus used are interchangeable where appropriate so that the embodiments described here can be implemented in an order other than what is illustrated or described here.

References to "several" in this article refer to two or more of them. "And/or" describes the relationship between the associated object, indicating that there can be three relationships, for example, A and/or B, which can be dedicated: A alone, both A and B at the same time, and B alone. The character "/" generally indicates that the relationship between the preceding and posting objects is an "or".

It is found that, for any type of Flink task (i.e., a streaming data processing task), computing nodes managed by the management nodes of the Flink engine may be deployed in the service cluster used to process the Flink task. Before executing the task, the user may assign fixed central processor unit resources and fixed memory resources to each computing node. The resources can be referred to as the vertical resources corresponding to each computing node, and the vertical resources of the computing nodes are combined, and the combined resources can be referred to as the horizontal resources of the service cluster. In order to reduce the running cost of Flink tasks and improve the running stability of Flink tasks, the auto-scaling schemes for Flink tasks appear, but the existing auto-scaling schemes are often on the basis that the central processors and memories pre-assigned by the user for the computing nodes are in a reasonable range, and therefore do not consider the vertical resources of the service cluster. Therefore, in executing the scaling operation specifically, only the way of adjusting the horizontal resources of the service cluster is often carried, i.e., only the way of adjusting the quantity of the computing nodes in the service cluster is often carried, which results in increasing the instability of the tasks or decreasing the resource utilization rate after executing the scaling, and reduces the reasonableness of the resource scaling. Therefore, how to perform a reasonable resource scaling on the service cluster has become a technical problem that is worth resolving.

Based on the above research, the present disclosure provides a method and an apparatus of resource adjustment for a service cluster, an electronic device and a storage medium. Determining of resource adjustment according to the task quantity of the streaming data processing tasks to be processed can accurately determine the resource adjustment operation that is required to be executed for processing the streaming data processing tasks (e.g., the resource scaling-out or resource scaling-in) and the resource quantity that is required to be adjusted (i.e., the parallelism degree to be adjusted). Because the resources that can be provided in the service cluster can be provided by the computing nodes that have been created and the central processor units, the parallelism degree to be adjusted, the first quantity of the computing nodes that have been created, and the resource utilization rate of the central processor unit can be used to accurately determine the second quantity of computing nodes to be adjusted and the core quantity to be adjusted of the central processor units. Performing of the resource adjustment operation based on the second quantity and the core quantity to be adjusted can adjust both the horizontal resources of the service cluster (i.e., computing nodes) and the vertical resources of the service cluster (i.e., the core quantity of the central processor units), thereby implementing the resource adjustment for the service cluster in perspectives, improving the resource reasonability of the service cluster and the resource utilization rate of the service cluster after the adjusting, ensuring that the streaming data processing tasks run stably, and avoiding the problem of unreasonable resource adjustment.

The defects that exist in the above schemes are the results of the inventors' practice and careful study, and therefore, the process of finding the above problems and the solutions proposed in the present disclosure hereinafter for the above problems should be the inventors' contributions to the present disclosure.

It should be noted that similar designations and letters indicate similar terms in the drawings below, so that once an item is defined in a drawing, it does not need to be further defined and explained in the subsequent drawings.

It is understandable that before using the technical solutions disclosed in each embodiment of this disclosure, the type, scope of use, and use scenarios of the personal information involved in this disclosure shall be informed to the user and the user's authorization shall be obtained through appropriate methods in accordance with relevant laws and regulations.

In order to facilitate the understanding of the present embodiment, firstly, a method of resource adjustment for a service cluster disclosed in the embodiment of the present disclosure is introduced in detail. The execution subject of the method of resource adjustment for the service cluster provided in the embodiment of the present disclosure is generally a terminal device or other processing device with certain computing power. The terminal device may be a user equipment (UE), a mobile device, a user terminal, a terminal, or a personal digital assistant (PDA), a handheld device, an electronic device, etc. In some possible implementations, the method of resource adjustment for the service cluster can be implemented by the processor calling computer-readable instructions stored in the memory.

The following takes the implementation subject that is a server as an example to illustrate the method of resource adjustment for the service cluster provided in the embodiments of the present disclosure.

As illustrated in FIG. 1, which is a flowchart of a method of resource adjustment for a service cluster provided in and embodiment of the present disclosure, the method may include the following steps S101~S103.

S101: determining resource adjustment information for a service cluster according to a task quantity of streaming data processing tasks to be processed, wherein the resource adjustment information includes a resource adjustment operation that is required to be executed for processing the streaming data processing tasks and a corresponding parallelism degree to be adjusted, and the parallelism degree to be adjusted is used to indicate a resource quantity that is required to be adjusted by the service cluster.

Here, a streaming data processing task may be a task for processing the streaming data according to a resource processing requirement, and is usually referred to as a Flink task. The method of resource adjustment for a service cluster provided in the embodiment of the present disclosure can implement the resource adjustment for the service cluster that is used to process any type of streaming data processing task. One type of streaming data processing task can correspond to a type of resource processing requirement. For example, the streaming data processing task to be processed may be a list calculation task, an order quantity calculation task, an interaction quantity calculation task, etc.

The streaming data processing task can be executed by using each computing node in at least one service cluster, and a Flink engine is deployed in each service cluster. Each service cluster may include a management node corresponding to the Flink engine and at least one computing node managed by the management node. Computing nodes can run in parallel. A service cluster may include machines, and each machine can have at least one computing node that is running therein. The streaming data processing task may include sub-tasks that match with types of operators. There may be sub-tasks under each type of operator. The sub-tasks for different types of operators may have different computing power, and are used to perform different data processing on streaming data. There may be sub-tasks for each type of operator. Exemplarily, the operators of various types may include, for example, resource source operators for data consumption types, intermediate operators for executing intermediate processing on data, sink operators for data output types, collection map operators for data iteration types, synchronization (sync) operators for data synchronization types, etc.

The management node can manage each computing node, and can schedule and assign a sub-task to the computing node for execution. Each computing node can run the sub-tasks corresponding to the streaming data processing task. A resource node exists in the computing node, and the quantity of resource node in a computing node may be preset and remain unchanged after setting. The sum of the resource quantity of the resource node(s) in a computing node is equal to the resource quantity corresponding to the computing node. For example, the resource node(s) in a computing node can equally share the total resource quantity of the computing nodes, and the total resource quantity of the computing nodes are the quantity of Central Processing Units (CPUs) and memories of the computing node, in which the quantity of CPUs is the core quantity of the CPUs.

At least one type of operator can exist in a resource node correspondingly, and each type of operator can correspond to at least one sub-task of the type. Therefore, each resource node can run a sub-task or sub-tasks as a minimum parallelism degree, and the maximum parallelism degree of the sub-tasks under any type of operator is the product of the quantity of computing nodes and the quantity of resource nodes in each computing node. The parallelism degree of a type of Flink task can be the parallelism degree of the sub-tasks having the maximum parallelism degree.

Specifically, the management node may be a Job Manager (JM) corresponding to the Flink engine, the computing node may be a Task Manager (TM) running in parallel, and the resource node in the TM may be referred to as a slot. For ease of understanding, the method of resource adjustment for a service cluster provided by the embodiments of the present disclosure will be described by using JM to denote the management node, TM to denote the computing node, and Slot to denote the resource node hereinafter.

The TM will be pre-configured with fixed CPUs and memories before restarting. The CPUs and memories assigned for each TM can be referred to as the vertical resource corresponding to the TM. The quantity of Slot in the TM will also be preset. The quantity of TM can be controlled by configuring the parallelism degree of the Flink task, and the sum of the vertical resources corresponding to TMs can be referred to as the horizontal resources of the service cluster. Once the streaming data processing tasks to be processed corresponding to the service cluster are scheduled, the horizontal resources and vertical resources corresponding to the service cluster are fixed. In response to the change in the task traffic, then the service cluster is required to perform a resource adjustment to adapt to the change of the traffic, and the resource adjustment operation includes the resource scaling-out operation and resource scaling-in operation.

As illustrated in FIG. 2, which is a structural schematic diagram of the management node, computing node and resource node in a service cluster provided in an embodiment of the present disclosure, a JM and TMs (only two TMs are shown as an example in FIG. 2, and the remaining TMs are represented by " . . . ") are included, and each TM includes three Slots. As to the two TMs illustrated in FIG. 2, a Slot is illustrated to correspond to two types of operators, i.e., a data consumption operator (source operator) and a data iteration operator (map operator), and under each type of operator at least one sub-task matching the type is illustrated. The CPUs and memories assigned to each TM are the vertical resources, and the sum of the vertical resources of all the TMs is the horizontal resource.

The task quantity is used to characterize the task traffic of the streaming data processing tasks, and the more the task quantity is, the larger the task traffic is, and the more cluster resources are required. Specifically, the task quantity may be the quantity of sub-task under the streaming data processing task. The streaming data processing task to be processed may be any type of Flink task, and the resource adjustment information may be the information about the service cluster that processes the Flink task.

The resource adjustment information may include the resource adjustment operation and the parallelism degree to be adjusted. The resource adjustment operation is used to indicate which operation is required to be executed on the service cluster, which can ensure that the service cluster can process the streaming data processing task having the task quantity. The parallelism degree can indicate the resource quantity that is required to be adjusted by the service cluster, and the resource quantity can be provided by the Slots, CPUs, and memories of all the TMs in the service cluster. In other words, the parallelism degree to be adjusted is the parallelism degree that is required to be adjusted for the streaming data processing task. The resource adjustment operation may include the resource scaling-out operation and the resource scaling-in operation, and the parallelism degree to be adjusted may include the parallelism degree to be increased corresponding to the resource scaling-out operation and the parallelism degree to be reduced corresponding to the resource scaling-in operation.

In specific implementations, the operation to be adjusted and the parallelism degree to be adjusted for the service cluster can be determined, according to the task quantity of the streaming data processing tasks to be processed and the maximum task parallelism degree that the service cluster can process currently (i.e., the original parallelism degree that is mentioned in the following). The original parallelism degree is determined by the quantity of TM currently included in the service cluster and the quantity of slot in each TM.

In an embodiment, step S101 can be implemented as follows:

S101-1: determining a target parallelism degree corresponding to streaming data processing tasks according to the task quantity.

Here, the target parallelism degree is used to indicate the total resource quantity required for the streaming data processing tasks of the task quantity.

In specific implementations, according to the task quantity, the parallelism degree of each type of operator corresponding to the streaming data processing tasks can be determined by using a parallelism degree algorithm, and the maximum parallelism degree is taken as the target parallelism degree. For example, the parallelism degrees of the source operator, sink operator, map operator, sync operator, and other operators can be calculated respectively by using the DS2 algorithm and according to the task quantity, and then the maximum parallelism degree is taken as the target parallelism degree.

S101-2: determining a total original parallelism degree corresponding to the service cluster, according to a first quantity and a node quantity of the resource node(s) in the computing node that has been created.

Here, the total original parallelism degree is used to indicate the maximum resource quantity that the service cluster can provide currently. The first quantity is the quantity of the computing nodes that have been created currently (i.e., the computing nodes that have been created) in the service cluster, i.e., the quantity of TMs that currently exist in the service cluster. The node quantity is the quantity of the resource nodes in the computing nodes that have been created, i.e., the quantity of Slots in the TMs.

In specific implementations, the total original parallelism degree can be determined according to the product of the first quantity and the node quantity.

S101-3: determining the resource adjustment operation and the parallelism degree to be adjusted, according to a difference value between the target parallelism degree and the total original parallelism degree.

In specific implementations, when the difference value between the target parallelism degree and the total original parallelism degree is larger than 0, the resource adjustment operation can be determined as a resource scaling-out operation, and the parallelism degree to be adjusted is the parallelism degree to be increased indicated by the difference value. On the other hand, when the difference value between the target parallelism degree and the total original parallelism degree is less than 0, the resource adjustment operation can be determined as a resource reduction operation, and the parallelism degree to be adjusted is the parallelism degree to be reduced indicated by the difference value. When the difference value between the target parallelism degree and the total original parallelism degree is 0, the resource adjustment operation is determined not to be executed.

S102: determining a core quantity to be adjusted corresponding to central processor units and the second quantity of computing nodes to be adjusted, according to the parallelism degree to be adjusted, the first quantity of the computing nodes that have been created in the service cluster, and a resource utilization rate of central processor units in each computing node that has been created.

Here, the computing nodes that have been created are the TMs that currently exist in the service cluster, and the first quantity is the quantity of TMs that currently exist. Each TM includes central processor units, i.e., CPUs, and each CPU has a core quantity, for example, 1 core, 2 cores, 4 cores, etc. The resource utilization rate is the utilization rate of the resources in the CPUs. In the case where a current existing TM includes CPUs, the resource utilization rate can include the resource utilization rates of the CPUs in each TM, and the resource utilization rates of the CPUs can be different.

The core quantity to be adjusted is the core quantity that needs to be increased or decreased in the CPUs in the current existing TMs, and the core quantity to be adjusted can be any integer. The computing node to be adjusted is the computing node that needs to be increased or decreased currently, the second quantity is the quantity of the computing nodes that need to be increased or decreased currently, and the quantity of computing nodes to be adjusted can be any integer.

In specific implementations, the maximum resource utilization rate can be determined according to the resource utilization rates respectively corresponding to the CPUs in the computing nodes that have been created. The core quantity to be adjusted is calculated according to the maximum resource utilization rate and the current core quantity of the CPUs. The conversion parallelism degree corresponding to the total quantity of the core quantity to be adjusted is determined according to the core quantity to be adjusted. The parallelism degree that the computing nodes to be adjusted needs to provide is determined according to the conversion parallelism degree and the parallelism degree to be adjusted. The second quantity of the computing nodes to be adjusted is determined according to the parallelism degree and the first quantity.

S103: executing the resource adjustment operation according to the core quantity to be adjusted and the second quantity, and obtaining the service cluster subject to resource adjusting, wherein the service cluster subject to resource adjusting is used to process streaming data processing tasks under the task quantity.

In specific implementations, after determining the core quantity to be adjusted and the second quantity, the resource scheduling function can be scheduled by calling the Application Programming Interface (API) that has the resource scheduling function corresponding to the Flink task. The called resource scheduling function is used to perform the resource adjustment operation in the service cluster according to the core quantity to be adjusted and the second quantity, so as to implement the adjustment for the resources in the service cluster. For example, the called resource scheduling function can be used to adjust the core quantity of the CPUs of the TMs in the service cluster according to the core quantity to be adjusted, which implements the adjustment for the vertical resources of the service cluster; according to the second quantity, new TMs of the second quantity are created in the service cluster, implementing the adjustment for the horizontal resources of the service cluster. Thus, the resource adjustment for the service cluster can be implemented to obtain the service cluster subject to resource adjusting, and then the service cluster subject to resource adjusting can have enough resource quantity for processing each streaming data processing task under the task quantity, i.e., processing the sub-tasks of the task quantity included in the streaming data processing task.

Alternatively, after determining the core quantity to be adjusted and the second quantity, the resource adjustment operation that need to be executed, the core quantity to be adjusted, and the second quantity of the computing nodes to be adjusted can be sent to the service cluster, so that the service cluster executes the resource adjustment operation by the way of restarting according to the core quantity to be adjusted and the second quantity, thereby implementing the automatic adjustment for resources and obtaining the service cluster subject to resource adjusting.

Thus, determining of the resource adjustment information according to the task quantity of the streaming data processing tasks to be processed can accurately determine the resource adjustment operation that need to be executed by the service cluster and the resource quantity that needs to be adjusted. Because the resources that can be provided in the service cluster can be provided by the computing nodes that have been created and the central processor units, the second quantity of the computing nodes to be adjusted and the core quantity to be adjusted of the central processor units can be accurately determined by using the parallelism degree to be adjusted, the first quantity of the computing nodes that have been created and the resource utilization rate of the central processor units. Based on the second quantity and the core quantity to be adjusted, performing the resource adjustment operation can not only adjust the horizontal resources of the service cluster, but also adjust the vertical resources of the service cluster, thereby implementing the resource adjustment for the service cluster in perspectives, improving the resource reasonability of the service cluster after adjusting and the resource utilization rate of the service cluster, ensuring that the streaming data processing tasks run stably, and avoiding the problem of unreasonable resource adjustment.

In an embodiment, the resource adjustment operation may include a resource scaling-out operation and a resource scaling-in operation, in which the resource scaling-out operation is an operation to increase the resources in the service cluster, and the resource scaling-in operation is an operation to reduce the resources in the service cluster. In the case where the resource adjustment operation includes the resource scaling-out operation, the core quantity to be adjusted may include the core quantity to be increased corresponding to the CPUs, the computing nodes to be adjusted may be the computing nodes to be increased in the service cluster, and the parallelism degree to be adjusted may be the parallelism degree that needs to be increased by the service cluster. In this case, the above step S102 can be implemented as follows:

S102-1: determining the core quantity to be adjusted of the central processor units, according to the resource utilization rate, an initial core quantity of the central processor units and a node quantity of resource nodes in the computing nodes that have been created.

Here, the initial core quantity is the core quantity of the CPU in the computing nodes that have been created included in the service cluster before the resource adjustment, and the initial core quantity of CPU in each computing node that has been created is generally the same. The resource nodes are the Slots in the TMs that have been created, the node quantity is the quantity of Slots in the TMs, and the node quantity of Slots in each TM that has been created is generally the same. For example, the node quantity of Slots in TMs that have been created in the service cluster corresponding to a Flink task may be four, each TM may include four Slots, and the initial core quantity of the CPUs in each TM can be 2 cores.

In specific implementations, as for the CPUs in each computing node that has been created, the resource utilization rate of the CPUs, the initial core quantity of the CPUs and the node quantity of the resource nodes in the computing nodes that have been created can be determined. Then, the maximum resource utilization rate can be determined from each resource utilization rate. In the case where the node quantity is larger than the initial core quantity, the product is rounded up according to the product of the maximum resource utilization rate and the initial core quantity, the number after rounding up is added by 1 to obtain the first core quantity. Then, the minimum value is selected as the core quantity to be increased from the first core quantity and the node quantity. Conversely, in the case where the node quantity is equal to or less than the initial core quantity, the core quantity to be increased can be determined to be 0.

In one embodiment, the above S102-1 can also be implemented in the following steps:

S102-1-1: in the case where the initial core quantity is less than a preset core quantity threshold value, determining whether a target resource utilization rate that is larger than the first preset threshold value exists in each resource utilization rate.

Here, the preset core quantity threshold value is the maximum CPU core quantity value that is preset for the CPUs and can be set empirically, and the embodiment of the present disclosure is not specifically limited in this aspect. The first preset threshold value may be set empirically, and the embodiment of the present disclosure is also not specifically limited in this aspect. For example, the preset core quantity threshold value can be 8, the first preset threshold value can be 80%, and the resource utilization rate can be the resource utilization rate P99 of the CPUs in a preset historical period (for example, the last 10 minutes), and here P99 indicates the resource utilization rate corresponding to 99% of the sub-tasks.

In specific implementations, whether the initial core quantity is less than the preset core quantity threshold value can be determined. If the result is yes, the step of determining whether the target resource utilization rate exists can be continued to execute; if the result is no, the core quantity to be increased can be determined to be 0 and the step S102-3 is executed, where the conversion parallelism degree is 0.

Of course, when determining whether to continue the step of determining whether the target resource utilization rate exists, the determining can be conducted in conjunction with the preset core quantity threshold value and the node quantity. Specifically, in response to the node quantity being less than or equal to the preset core quantity threshold value, in the case where the initial core quantity is less than the preset core threshold value, in response to the initial core quantity being less than the node quantity, the step of determining whether the target resource utilization rate exists can be continued to execute, and in response to the initial core quantity being not less than the node quantity, the core quantity to be increased can be determined to be 0; and in the case where the initial core quantity is not less than the preset core threshold value, the core quantity to be increased can be determined to be 0. In response to the node quantity is larger than the preset core threshold value, in the case where the initial core quantity is less than the preset core threshold value, the step of determining whether the target resource utilization rate exists can be continued to execute; and in the case where the initial core quantity is larger than or equal to the preset core threshold value, regardless of whether the initial core quantity is less than the node quantity, the core quantity to be increased can be determined to be 0. That is, no matter whether the initial core quantity is less than the node quantity, as long as the initial core quantity is larger than or equal to the preset core threshold value, the core quantity to be increased can be determined to be 0. In response to the initial core quantity being less than the preset core threshold value, and in response to the initial core quantity being also less than the node quantity, the step of determining whether the target resource utilization rate exists can be continued to execute; and in response to the initial core quantity being not less than the node quantity, the core quantity to be increased can be determined to be 0.

As for the step of "continuing to execute determining whether the target resource utilization rate exists", in response to the initial core quantity being less than the preset core threshold value, whether the target resource utilization rate that is larger than the first preset threshold value exists can be determined according to the resource utilization rate P99 of the CPUs, in the computing nodes that have been created, in the last 10 minutes. If the result is no, the core quantity to be increased can be determined to be 0. If the result is yes, the step S102-1-2 as described below can be continued to execute.

S102-1-2: if yes, determining a target core quantity according to the target resource utilization rate, the initial core quantity and a second preset threshold value.

Here, the second preset threshold value may be set empirically, and the embodiments of the present disclosure are not specifically limited in this aspect. For example, the second preset threshold value can be 65%.

In specific implementations, in the case where a target resource utilization exists, in response to the target resource utilization rate including resource utilization rates, the maximum target resource utilization rate can be selected. According to the product of the maximum target resource utilization rate and the initial core quantity, the first product value is determined, and then the ratio of the first product value to the second preset threshold value is rounded up to obtain the target core quantity. If there is only one target resource utilization rate, then the first product value can be directly determined according to the product of this unique target resource utilization rate and the initial core quantity, and then the ratio of the first product value to the second preset threshold value is rounded up to obtain the target core quantity.

S102-1-3: determining the core quantity to be increased according to a minimum value of the target core quantity, the node quantity, the preset core quantity threshold value, and the initial core quantity.

In specific implementations, the minimum value is selected from the target core quantity, the node quantity and the preset core threshold value, and the difference value between the minimum value and the initial core quantity can be taken as the core quantity to be increased.

For example, the quantity of Slots in a TM is 4, the initial core quantity of CPUs is 2, the preset core threshold value is 8, the target resource utilization rate is 90% and the second preset threshold value is 65%, the target core quantity can be determined to be 3, then the minimum value that is selected from the target core quantity, the quantity of slots and the preset core threshold value is 3, and then the core quantity to be increased can be determined to be 1.

S102-2: determining a conversion parallelism degree corresponding to the core quantity to be increased according to the core quantity to be increased and the first quantity; the conversion parallelism degree being used to characterize a parallelism degree that is equivalently increased based on the total original parallelism degree corresponding to the service cluster, after respectively adding the core quantity to be increased to the central processor units in each computing node that has been created.

Here, the conversion parallelism degree is used to characterize the increase for the resource quantity that can be brought about based on the original resource quantity of the service cluster, after respectively increasing the core quantity to be increased to the CPU in each computing node that has been created.

In specific implementations, a total increased core quantity can be determined according to the product of the core quantity to be increased and the first quantity, and then the product of the total increased core quantity and the preset core quantity parallelism degree can be used to determine the conversion parallelism degree.

In one embodiment, S102-2 may further be implemented as following:

S102-2-1: determining a total increased core quantity according to the core quantity to be adjusted and the first quantity.

In specific implementations, the total increased core quantity can be determined according to the product of the core quantity to be adjusted and the first quantity.

S102-2-2: determining the conversion parallelism degree according to the node quantity and a ratio of the total increased core quantity to the initial core quantity.

In specific implementations, the ratio of the total increased core quantity to the initial core quantity can be determined firstly, and the ratio is used to characterize the quantity of the computing nodes that have been created, which can be equivalent to the total increased core quantity. Then, the product of the ratio of the node quantity and the total increased core quantity to the initial core quantity can be determined, and the product is taken as the conversion parallelism degree.

For example, assuming that the quantity of TMs is 4, the quantity of Slots in TM is 4, the initial core quantity of the CPU is 2, the preset core threshold value is 8 and the core quantity to be increased is 2, the total increased core quantity is determined to be 8 according to the core quantity to be increased and the quantity of TMs, and then the ratio of the total increased core quantity to the initial core quantity is determined to be 4. The ratio is used to indicate that after increasing 2 cores to each TM, equivalently, 4 new TMs are increased. After that, according to the ratio (i.e., 4) and the quantity of Slots, the conversion parallelism degree can be determined to be 16.

S102-3: in the case where the conversion parallelism degree is less than the parallelism degree to be adjusted, determining the second quantity of the computing nodes to be increased according to the conversion parallelism degree, the parallelism degree to be adjusted and the node quantity.

Here, when resources are scaled-out, the second quantity of the computing nodes to be increased is related to the conversion parallelism degree, and the conversion parallelism degree is determined by the core quantity to be increased of the CPUs.

In specific implementations, after determining the conversion parallelism degree, whether the conversion parallelism degree is less than the parallelism degree to be adjusted can be determined; if no, then the second quantity of the computing nodes to be increased can be determined to be 0; if yes, then a parallelism degree that needs to be supplemented by using new computing nodes, can be determined according to the conversion parallelism degree and the parallelism degree to be adjusted, and then the ratio of the parallelism degree to the node quantity is used to determine the second quantity of the computing nodes to be increased.

In one embodiment, the S102-3 may further be implemented as following:

S102-3-1: determining a difference parallelism degree between the parallelism degree to be adjusted and the conversion parallelism degree.

In specific implementations, the difference value between the parallelism degree to be adjusted and the conversion parallelism degree can be taken as the difference parallelism degree.

S102-3-2: in the case where the difference parallelism degree is larger than a target threshold value, determining the second quantity of the computing nodes to be increased according to a ratio of the difference parallelism degree to the node quantity.

In specific implementations, the target threshold value may be 0. In the case where the difference parallelism degree is larger than 0, the ratio of the difference parallelism degree to the node quantity can be taken as the second quantity of the computing nodes to be increased. The core quantity of the CPUs in the computing node to be increased can be the initial core quantity plus the core quantity to be increased, or the core quantity of the CPU in the computing node to be increased can also be the initial core quantity.

Alternatively, in the case where the difference parallelism degree is larger than 0, the second quantity of the computing nodes to be increased can be determined by using the difference parallelism degree, the node quantity, and the equivalent parallelism degree after increasing the core quantity to be increased to each computing node to be increased. The core quantity of the CPUs in the computing node to be increased can be the initial core quantity plus the core quantity to be increased.

Alternatively, in the case where the core quantity of the CPUs in the computing node to be increased is the initial core quantity plus the core quantity to be increased, the second quantity of the computing nodes to be increased can be any value within the range corresponding to the second quantity determined by the above-mentioned two methods.

Further, after determining the second quantity of the computing nodes to be increased and the core quantity to be increased, according to the second quantity of the computing nodes to be increased and the core quantity to be increased, the resource scaling-out operation for the service cluster can be executed to obtain the service cluster subject to resource adjusting. Specifically, the core quantity of the CPUs of the computing nodes that have been created in the service cluster can be increased according to the core quantity to be increased; and then the new computing nodes of second quantity are created according to the second quantity.

For example, assuming that the quantity of TMs is 4, the quantity of Slots in a TM is 4, the initial core quantity of the CPUs is 2, the preset core threshold value is 8, the core quantity to be increased is 2 and the parallelism degree to be adjusted is 48, the total increased core quantity is determined to be 8 according to the core quantity to be increased and the quantity of TMs, and then a ratio of the total increased core quantity to the initial core quantity can be determined to be 4, and the ratio is used to indicate that after increasing 2 cores to each TM, and therefore equivalently, 4 new TMs are increased. After that, according to the ratio (i.e., 4) and the quantity of Slots, the conversion parallelism degree can be determined to be 16. According to the conversion parallelism degree and the parallelism degree to be adjusted, the difference parallelism degree can be determined to be 32. Finally, according to the difference parallelism degree and the quantity of Slots, the second quantity of the computing nodes to be increased is determined to be 8. Here, the core quantity of the CPUs in each computing node to be increased can be 2 or 4.

Alternatively, further in the above example, after determining the difference parallelism degree to be 32 according to the conversion parallelism degree and the parallelism degree to be adjusted, the equivalent parallelism degree after increasing the core quantity to be increased to each computing node to be increased can also be calculated. The equivalent parallelism degree determined here is 4, and then the second quantity of the computing nodes to be increased can be determined to be 4 according to the equivalent parallelism degree (i.e., 4), the difference parallelism degree (i.e., 32) and the quantity of Slots (i.e., 4).

Alternatively, further in the above example, in the case where the core quantity of the CPUs in the computing node to be increased is the initial core quantity plus the core quantity to be increased (i.e., in the case where the core quantity of the CPUs in the computing node to be increased is 4), the second quantity of the computing nodes to be increased can be any value in the interval [4, 8].

Further, after determining that the core quantity to be increased is 2 and the second quantity is 8, the resource scaling-out operation for the service cluster can be executed, which increases the core quantity of the CPUs of the existing computing nodes that have been created in the service cluster from 2 to 4, and creates 8 new computing nodes. The core quantity of the CPUs in each computing node is 4 and the quantity of Slots is 4. Thus, the service cluster subject to resource adjusting can include 12 TMs, and the core quantity of each TM is 4 and the quantity of Slots is 4.

Thus, based on the core quantity to be increased and the second quantity that are determined, the horizontal scale-out and the vertical scale-out are performed on the service cluster, which can complete the resource adjustment without wasting additional resources, avoid the unreasonableness and task risk that are caused by the too small vertical resources of a single computing node, improve the reasonableness of the resource scaling-out, and obtain the service cluster that can stably process the streaming data processing task after the change of traffic.

In another embodiment, in the case where the resource adjustment operation includes a resource scaling-in operation, the core quantity to be adjusted may include a core quantity to be reduced corresponding to the CPUs, the computing nodes to be adjusted may be the computing nodes to be reduced in the service cluster, and the parallelism degree to be adjusted may be the parallelism degree that needs to be reduced by the service cluster. In this case, the above step S102 may be implemented as following:

S1: in the case where the first quantity is larger than a preset quantity, determining the second quantity of the computing nodes to be reduced according to the parallelism degree to be adjusted and a node quantity of resource nodes in the computing nodes that have been created.

In specific implementations, the preset quantity may be 1. When the resource adjustment information indicates that a resource scaling-in operation needs to be executed, whether the first quantity of the current existing computing nodes that have been created in the service cluster is larger than the preset quantity can be determined first. If the result is no, no need to perform the resource scaling-in by the way of reducing the quantity of the computing nodes can be determined, then the second quantity of the computing nodes to be reduced can be determined to be 0, and then the following steps S2 and S3 can be executed to implement the reduction of vertical resources. For the currently existing technology as reference, in the case where the first quantity is not larger than the preset quantity, then no need to execute the resource scaling-in operation can be directly determined, and the vertical resources will not be reduced.

In the case where the first quantity is larger than the preset quantity, the ratio of the parallelism degree to be adjusted to the node quantity of the resource nodes in the computing nodes that have been created can be determined to be the second quantity of the computing nodes to be reduced, which need to be reduced.

S2: in the case where a difference value between the second quantity of the computing nodes to be reduced and the first quantity is equal to the preset quantity, determining whether the resource utilization rate of the computing nodes that have been created of the preset quantity is less than the third preset threshold value.

Here, the third preset threshold value can be set empirically, and the embodiments of the present disclosure are not specifically limited. For example, the third preset threshold value may be 40%, 50%, etc.

In specific implementations, in the case where the difference value between the second quantity of the computing nodes to be reduced and the first quantity is equal to the preset quantity, it can be determined that after reducing the computing nodes that have been created of the second quantity from the service cluster, the quantity of the remaining computing nodes that have been created in the service cluster is one, and the resource utilization rate of the CPU in the sole computing node that has been created can be determined. The resource utilization rate determined here may be the resource utilization rate P99 of the sole computing node that has been created, in the preset target historical time period (for example, in the last 24 hours, or in the last 10 minutes). Then, whether the resource utilization rate is less than the third preset threshold value is determined. If the result is yes, then it indicates that even if the quantity of the computing nodes that have been created is reduced to 1 only, the resource utilization rate of the CPUs is still not high, and therefore, performing the resource adjustment need to be continued to ensure that the resource utilization rate of the CPUs is within a reasonable range, thereby the following step S3 can be executed.

If it is determined that the resource utilization is less than or equal to the third preset threshold value, then the resource utilization rate of the CPUs is within a reasonable range after the quantity of computing nodes that have been created is reduced to 1, and the core quantity to be reduced can be determined to be 0. Then, according to the second quantity and the core quantity to be reduced (i.e., 0), the resource scaling-in operation for the service cluster is executed, so as to cause the quantity of the computing nodes that have been created in the service cluster to become 1.

Optionally, in the case where the difference value between the second quantity and the first quantity is equal to the preset quantity, the core quantity to be reduced can be directly determined to be 0. Then, according to the second quantity and the core quantity to be reduced, the resource scaling-in operation for the service cluster is executed, so as to cause the quantity of the computing nodes that have been created in the service cluster to become 1. After the quantity of the computing nodes that have been created in the service cluster becomes 1, and after the service cluster runs for a certain period of time, the resource utilization rate of the CPUs in the sole computing node that has been created can be obtained, and whether the resource utilization rate is less than the third preset threshold value can be determined. If the result is yes, then the core quantity to be reduced can be determined according to the following step S3, and the new second quantity can be determined to be 0. Then, according to the core quantity to be reduced and the new second quantity (i.e., 0), the resource scaling-in operation for the service cluster is executed to implement the reduction of the vertical resources for the service cluster. If the result is no, it can indicate that the resource utilization rate of the CPUs is within a reasonable range, and there is no need to reduce the core quantity of the CPUs, i.e., there is no need to reduce the vertical resources of a single TM.

S3: if yes, determining the core quantity to be reduced of the central processor units according to the resource utilization rate, the initial core quantity of the central processor units and a second preset threshold value.

Here, the second preset threshold value may be set empirically, and the embodiments of the present disclosure are not specifically limited. For example, the second preset threshold value may be 65%.

In specific implementations, the second product value of the resource utilization rate and the initial core quantity can be determined first, and then the ratio of the second product value to the second preset threshold value can be rounded up to obtain the rounded core quantity, and finally the difference value between the initial core quantity and the rounded core quantity can be taken as the core quantity to be reduced.

Then, after determining the second quantity of the computing nodes to be reduced and the core quantity to be reduced, according to the second quantity of the computing nodes to be reduced and the core quantity to be reduced, the resource scaling-in operation for the service cluster can be executed to obtain the service cluster subject to resource adjusting. Specifically, the quantity of the computing nodes that have been created in the service cluster can be reduced to a preset quantity according to the second quantity first, and then the core quantity of the CPUs of the computing nodes that have been created of the preset quantity is reduced according to the core quantity to be reduced, thereby obtaining the service cluster subject to resource adjusting.

Thus, based on the determined core quantity to be reduced and the second quantity, the service cluster can be scaled-in horizontally and vertically, and in the case where the single computing node still has a resource compression space, the vertical scaling-in for resources can be continued to complete, which improves the reasonableness of resource scaling-in, and obtains the service cluster that can stably process the streaming data processing task after the traffic changes.

As illustrated in FIG. 3, which is a specific implementation flowchart of a method of resource adjustment for a service cluster provided in the embodiment of the present disclosure, and the method may include the following steps:

S301: determining resource adjustment information for a service cluster according to a task quantity of streaming data processing tasks to be processed.

In the case where the resource adjustment operation indicated by the resource adjustment information is a resource scaling-out operation, steps S302~S312 below can be executed; and in the case where the resource adjustment operation indicated by the resource adjustment information is a resource scaling-in operation, steps S313~S320 below can be executed.

S302: determining whether the initial core quantity of the CPUs is less than the preset core threshold value.

If no, then step S303 is executed; and if yes, then step S304 is executed.

S303: determining that the core quantity to be increased is 0, and determining the second quantity according to the parallelism degree to be adjusted and the node quantity.

Specifically, the ratio of the parallelism degree to be adjusted to the node quantity can be taken as the second quantity. After executing step S303, it can switch to execute step S312.

S304: determining whether a target resource utilization rate that is larger than the first preset threshold value exists in the resource utilization rate of each CPU.

If no, then step S305 below is executed; and if yes, then step S306 below is executed.

S305: determining that the core quantity to be increased is 0, and determining the second quantity according to the parallelism degree to be adjusted and the node quantity.

Specifically, the ratio of the parallelism degree to be adjusted to the node quantity can be taken as the second quantity. After executing step S305, it can switch to execute step S312.

S306: determining a target core quantity according to the target resource utilization rate, the initial core quantity, and the second preset threshold value.

S307: determining the core quantity to be increased according to the minimum value of the target core quantity, the node quantity and the preset core quantity threshold value, and the initial core quantity.

S308: determining a conversion parallelism degree corresponding to the core quantity to be increased according to the core quantity to be increased and the first quantity.

S309: determining whether the conversion parallelism degree is less than the parallelism degree to be adjusted.

If no, then step S310 below is executed; and if yes, then step S311 below is executed.

S310: determining that the second quantity is 0.

After executing step S310, it can be switched to execute step S312.

S311: determining the second quantity of the computing nodes to be increased according to the conversion parallelism degree, the parallelism degree to be adjusted, and the node quantity.

S312: executing the resource-scaling-out operation according to the core quantity to be increased and the second quantity, and obtaining a service cluster after resource scaling-out.

S313: determining whether the quantity of the computing nodes that have been created is larger than a preset quantity.

If no, step S314~S315 below are executed; and if yes, step S316~S319 below are executed.

S314: determining that the second quantity of the computing nodes to be reduced is 0.

S315: In the case where the resource utilization rate of the preset quantity of the computing nodes that have been created is less than the third preset threshold value, determining the core quantity to be reduced of the central processing unit according to the resource utilization rate, the initial core quantity of the central processing unit, and the second preset threshold value.

Here, after executing step S315, it can be switched to execute step S320 below.

S316: determining the second quantity of the computing nodes to be reduced according to the parallelism degree to be adjusted and the node quantity of the resource nodes in the computing nodes that have been created.

S317: In the case where the difference value between the second quantity and the first quantity is equal to the preset quantity, determining whether the resource utilization rate of the preset quantity of the computing nodes that have been created is less than the third preset threshold value.

If no, then step S318 below is executed; and if yes, then step S319 below is executed.

S318: determining that the core quantity to be reduced is 0.

After executing step S318, it can be switched to execute step S320.

S319: determining the core quantity to be reduced of the CPUs according to the resource utilization rate, the initial core quantity of the central processor unit, and the second preset threshold value.

S320: executing the resource scaling-in operation according to the core quantity to be reduced and the second core quantity, and obtaining a service cluster after resource scaling-in.

The specific implementation steps of above steps S301~S320 can refer to the above embodiments, which will not be repeated herein.

Those skilled in the art may understand that in the above-mentioned method of the specific embodiment, the recited order of the steps neither implies a strict order of execution nor constitutes any limitation on the implementation process, and the specific order of execution of the steps shall be determined by the function and possible internal logic.

Based on the same conception, at least one embodiment of the present disclosure also provides a resource adjustment device for a service cluster corresponding to the method of resource adjustment for the service cluster, and because the principle of solving the problem of the device in the embodiment of the present disclosure is similar to the method of resource adjustment for the service cluster in the embodiment of the present disclosure, the implementation of the device can be referred to the implementation of the method, and the repetition will not be repeated.

Figure 4:
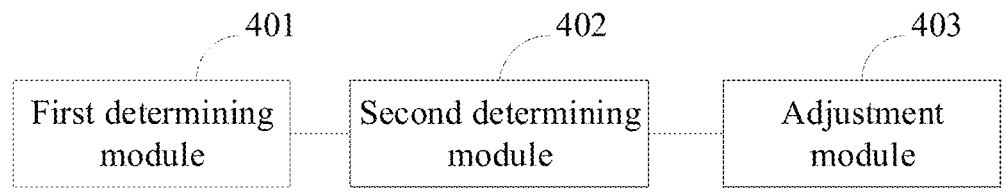
FIG. 4 illustrates a schematic diagram of an apparatus of resource adjustment for a service cluster provided in an embodiment of the present disclosure.

As illustrated in FIG. 4, which is a schematic diagram of an apparatus of resource adjustment for a service cluster provided in an embodiment of the present disclosure, the apparatus includes a first determining module 401, a second determining module 402, and an adjustment module 403.

The first determining module 401 is configured to determine resource adjustment information for the service cluster according to a task quantity of streaming data processing tasks to be processed. The resource adjustment information includes a resource adjustment operation that is required to be executed for processing the streaming data processing tasks and a corresponding parallelism degree to be adjusted. The parallelism degree to be adjusted is used to indicate a resource quantity that is required to be adjusted by the service cluster.

The second determining module 402 is configured to determine a core quantity to be adjusted corresponding to central processor units and the second quantity of computing nodes to be adjusted, according to the parallelism degree to be adjusted, the first quantity of the computing nodes that have been created in the service cluster, and a resource utilization rate of central processor units in each computing node that has been created.

The adjustment module 403 is configured to execute the resource adjustment operation according to the core quantity to be adjusted and the second quantity, and obtain a service cluster subject to resource adjusting, in which the service cluster subject to resource adjusting is used to process streaming data processing tasks under the task quantity.

In an alternative embodiment, in the case where the resource adjustment operation includes a resource scaling-out operation, the core quantity to be adjusted includes a core quantity to be increased, and the computing nodes to be adjusted include computing nodes to be increased; when the second determining module 402 determines a core quantity to be adjusted corresponding to central processor units and the second quantity of computing nodes to be adjusted, according to the parallelism degree to be adjusted, the first quantity of the computing nodes that have been created in the service cluster, and the resource utilization rate of the central processor units in each computing node that has been created, the second determining module 402 is configured to:

determine the core quantity to be adjusted of the central processor units, according to the resource utilization rate, an initial core quantity of the central processor units and a node quantity of resource nodes in the computing nodes that have been created;

determine a conversion parallelism degree corresponding to the core quantity to be increased according to the core quantity to be increased and the first quantity; in which the conversion parallelism degree is used to characterize a parallelism degree that is equivalently increased based on the total original parallelism degree corresponding to the service cluster, after respectively adding the core quantity to be increased to the central processor units in each computing node that has been created; and in the case where the conversion parallelism degree is less than the parallelism degree to be adjusted, determine the second quantity of the computing nodes to be increased according to the conversion parallelism degree, the parallelism degree to be adjusted, and the node quantity.

In an alternative embodiment, when the second determining module 402 determines the core quantity to be adjusted of the central processor units, according to the resource utilization rate, the initial core quantity of the central processor unit, and the node quantity of resource nodes in the computing nodes that have been created, the second determining module 402 is configured to:

in the case where the initial core quantity is less than a preset core quantity threshold value, determine whether a target resource utilization rate that is larger than the first preset threshold value exists in each resource utilization rate;

if yes, determine a target core quantity according to the target resource utilization rate, the initial core quantity and the second preset threshold value; and determine the core quantity to be increased according to a minimum value of the target core quantity, the node quantity and the preset core quantity threshold value, and the initial core quantity.

In an alternative embodiment, when the second determining module 402 determines a conversion parallelism degree corresponding to the core quantity to be increased according to the core quantity to be increased and the first quantity, the second determining module 402 is configured to:

determine a total increased core quantity according to the core quantity to be adjusted and the first quantity; and determine the conversion parallelism degree according to the node quantity and a ratio of the total increased core quantity to the initial core quantity.

In a possible embodiment, when the second determining module 402 determines the second quantity of the computing nodes to be increased according to the conversion parallelism degree, the parallelism degree to be adjusted, and the node quantity, the second determining module 402 is configured to:

determine a difference parallelism degree between the parallelism degree to be adjusted and the conversion parallelism degree; and in the case where the difference parallelism degree is larger than a target threshold value, determine the second quantity of the computing nodes to be increased according to a ratio of the difference parallelism degree to the node quantity.

In a possible embodiment, in the case where the resource adjustment operation includes a resource reduction operation, the core quantity to be adjusted includes a core quantity to be reduced, and the computing nodes to be adjusted include computing nodes to be reduced;

when the second determining module 402 determines a core quantity to be adjusted corresponding to central processor units and the second quantity of computing nodes to be adjusted, according to the parallelism degree to be adjusted, the first quantity of the computing nodes that have been created in the service cluster, and the resource utilization rate of the central processor units in each computing node that has been created, the second determining module 402 is configured to:

in the case where the first quantity is larger than a preset quantity, determine the second quantity of the computing nodes to be reduced, according to the parallelism degree to be adjusted and a node quantity of resource nodes in the computing nodes that have been created;

in the case where a difference value between the second quantity of the computing nodes to be reduced and the first quantity is equal to the preset quantity, determine whether the resource utilization rate of the computing nodes that have been created of the preset quantity is less than the third preset threshold value; and if yes, determine the core quantity to be reduced of the central processor units according to the resource utilization rate, the initial core quantity of the central processor unit, and the second preset threshold value.

In one possible embodiment, when the first determination module 401 determines resource adjustment information for the service cluster according to a task quantity of streaming data processing tasks to be processed, the first determination module 401 is configured to:

determine a target parallelism degree corresponding to the streaming data processing tasks according to the task quantity;

determine a total original parallelism degree corresponding to the service cluster, according to the first quantity and a node quantity of resource nodes in the computing nodes that have been created; and determine the resource adjustment operation and the parallelism degree to be adjusted, according to a difference value between the target parallelism degree and the total original parallelism degree.

The description of the processing flow of each module in the apparatus and the interaction flow between each module can refer to the relevant description in the above method embodiment, and will not be described in detail here.

Figure 5:
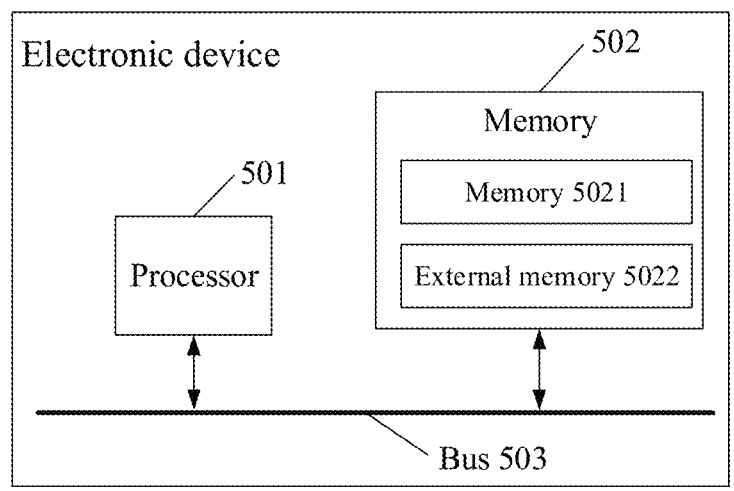
FIG. 5 illustrates a structural schematic diagram of an electronic device provided in the embodiment of the present disclosure.

Based on the same technical conception, an embodiment of the present disclosure further provides an electronic device. With reference to FIG. 5, which is a structural schematic diagram of an electronic device provided in the embodiment of the present disclosure, the electronic device includes at least one processor 501, a memory 502, and a bus 503.

The memory 502 stores machine-readable instructions that can be executed by the processor 501. The processor 501 is used to execute the machine-readable instructions stored in the memory 502. When the machine-readable instructions are executed by the processor 501, the processor 501 executes the following steps, S101~S103. The S101 includes: determining resource adjustment information for the service cluster according to a task quantity of streaming data processing tasks to be processed; in which the resource adjustment information includes a resource adjustment operation that is required to be executed for processing the streaming data processing tasks and a corresponding parallelism degree to be adjusted, and the parallelism degree to be adjusted is used to indicate a resource quantity that is required to be adjusted by the service cluster. The S102 includes: determining a core quantity to be adjusted corresponding to central processor units and a second quantity of computing nodes to be adjusted, according to the parallelism degree to be adjusted, a first quantity of the computing nodes that have been created in the service cluster, and a resource utilization rate of central processor units in each computing node that has been created. The S103 includes: executing the resource adjustment operation according to the core quantity to be adjusted and the second quantity, and obtaining a service cluster subject to resource adjusting, in which the service cluster subject to resource adjusting is used to process streaming data processing tasks under the task quantity.

The above memory 502 includes a memory 5021 and an external memory 5022; the memory 5021 herein is also referred to as an internal memory and is used for temporarily storing the arithmetic data in the processor 501 and the data exchanged with the external memory 5022 such as a hard disk. The processor 501 exchanges data with the external memory 5022 through the memory 5021. When the electronic device is running, the processor 501 communicates with the memory 502 through a bus 503, so that the processor 501 executes the execution instruction mentioned in the embodiment of the method described in the above method.

The embodiment of the disclosure also provides a non-transient computer-readable storage medium on which computer programs are stored, and the computer programs are run by a processor to execute the steps of the method of resource adjustment for a service cluster described in the above method embodiments. The non-transient storage medium may be a volatile or non-volatile computer-readable storage medium.

The computer program product of the method of resource adjustment for the service cluster provided in the embodiment of the present disclosure includes a non-transient storage medium that stores program codes. and the instructions included in the program codes can be used to execute the steps of the method of resource adjustment for the service cluster described in the method embodiments, which can refer to the method embodiment specifically, and is not repeated herein.

The computer program product can be implemented in hardware, software, or a combination thereof. In one optional embodiment, the computer program product is embodied as a computer storage medium, and in another optional embodiment, the computer program product is embodied in a software product, such as a software development kit (SDK) and the like.

Those skilled in the art can clearly understand that, for the convenience and conciseness of the description, the specific working process of the system and device described above can refer to the corresponding process in the aforesaid method embodiment, and will not be repeated herein. In several embodiments provided in the present disclosure, it should be understood that the disclosed systems, devices and methods can be realized by other means. The device embodiments described above are only schematic, for example, the division of the units is only a logical function division, and there may be another division mode when the actual implementation is realized, and for example, a plurality of units or components can be combined or can be integrated into another system, or some features can be ignored, or not executed. On the other hand, the coupling or direct coupling or communication connection between each other shown or discussed may be indirect coupling or communication connection through some communication interface, device or unit, which may be in electrical, mechanical or other form.

The unit described as a description of the detached part may or may not be physically separated, and the part displayed as a unit may or may not be a physical unit, that is, may be located in a place, or may also be distributed on a plurality of network units. Some or all of these units can be selected according to actual needs to realize the purpose of the present embodiment.

In addition, each functional unit in each embodiment of the present disclosure may be integrated in a processing unit, or each unit may exist separately physically, or two or more units may be integrated in a single unit.

The described function, if implemented in the form of a software functional unit and marketed or used as a stand-alone product, may be stored in a non-volatile computer-readable storage medium executable by a processor. Based on this understanding, the technical solution of the present disclosure is in essence or the part that contributes to the prior art or the part of the technical solution may be embodied in the form of a software product stored in a storage medium that includes instructions for enabling an electronic device (which may be a personal computer, server, or network equipment, etc.) to perform all or part of the steps of the method described in each embodiment of the present disclosure. The aforementioned storage media include: USB flash drive, portable hard disk, Read-Only Memory (ROM), Random Access Memory (RAM), disk disks or optical discs and other media that can store program code.

In the case where the technical solution of the present disclosure involves personal information, the products applying the technical solution of the present disclosure have clearly informed the rules for the processing of personal information before processing personal information, and obtained the individual's independent consent. In the case where the technical solution of the present disclosure involves sensitive personal information, the product applying the technical solution of the present disclosure has obtained the individual's separate consent before processing sensitive personal information, and at the same time meets the requirement of "express consent". For example, in the case of a personal information collection device such as a camera, a clear and conspicuous sign is set up to inform that the personal information collection scope has been entered and that the personal information will be collected, and if the individual voluntarily enters the collection area, the personal information will be deemed to have consented to the collection of the personal information. In the case of information informing the personal information processing rules, the individual's authorization is obtained through pop-up information or by asking the individual to upload his or her personal information on his or her own, where the personal information processing rules may include information such as the personal information processor, the purpose of personal information processing, the method of processing, and the type of personal information processed.

Finally, it should be noted that the above-mentioned embodiments are only specific embodiments of the present disclosure, which are used to illustrate the technical solutions of the present disclosure, not to limit them, and the scope of protection of the present disclosure is not limited to this, although the present disclosure is described in detail with reference to the aforesaid embodiments, a person skilled in the art should understand that any person skilled in the art who is familiar with the art can still modify or easily think of changes to the technical solutions described in the foregoing embodiments, or replace some of the technical features therein, and these modifications, change or replacement, which does not depart the essence of the corresponding technical solution from the spirit and scope of the embodiment of the present disclosure, shall be covered by the scope of protection of the present disclosure. Therefore, the scope of protection of this disclosure shall be described in accordance with the scope of protection of the claims.

The invention claimed is:

1. A method of resource adjustment for a service cluster, comprising:
   determining resource adjustment information for the service cluster according to a task quantity of streaming data processing tasks to be processed, wherein the resource adjustment information comprises a resource adjustment operation that is required to be executed for processing the streaming data processing tasks and a corresponding parallelism degree to be adjusted, and the parallelism degree to be adjusted is used to indicate a resource quantity that is required to be adjusted by the service cluster;
   determining a core quantity to be adjusted corresponding to central processor units and a second quantity of computing nodes to be adjusted, according to the parallelism degree to be adjusted, a first quantity of the computing nodes that have been created in the service cluster, and a resource utilization rate of central processor units in each computing node that has been created; and
   executing the resource adjustment operation according to the core quantity to be adjusted and the second quantity, and obtaining a service cluster subject to resource adjusting, wherein the service cluster subject to resource adjusting is used to process streaming data processing tasks under the task quantity.

2. The method according to claim 1, wherein, in a case where the resource adjustment operation comprises a resource scaling-out operation, the core quantity to be adjusted comprises a core quantity to be increased, and the computing nodes to be adjusted comprise computing nodes to be increased;
   the determining a core quantity to be adjusted corresponding to central processor units and a second quantity of computing nodes to be adjusted, according to the parallelism degree to be adjusted, the first quantity of the computing nodes that have been created in the service cluster, and the resource utilization rate of the central processor units in each computing node that has been created, comprises:
   determining the core quantity to be adjusted of the central processor units, according to the resource utilization rate, an initial core quantity of the central processor units and a node quantity of resource nodes in the computing nodes that have been created;
   determining a conversion parallelism degree corresponding to the core quantity to be increased according to the core quantity to be increased and the first quantity; the conversion parallelism degree being used to characterize a parallelism degree that is equivalently increased based on the total original parallelism degree corresponding to the service cluster, after respectively adding the core quantity to be increased to the central processor units in each computing node that has been created; and
   in a case where the conversion parallelism degree is less than the parallelism degree to be adjusted, determining a second quantity of the computing nodes to be increased according to the conversion parallelism degree, the parallelism degree to be adjusted and the node quantity.

3. The method according to claim 2, wherein the determining the core quantity to be adjusted of the central processor units, according to the resource utilization rate, the initial core quantity of the central processor units and the node quantity of the resource nodes in the computing nodes that have been created, comprises:
   in a case where the initial core quantity is less than a preset core quantity threshold value, determining whether a target resource utilization rate that is larger than a first preset threshold value exists in each resource utilization rate;
   in response to the target resource utilization rate that is larger than the first preset threshold value existing in each resource utilization rate, determining a target core quantity according to the target resource utilization rate, the initial core quantity and a second preset threshold value; and
   determining the core quantity to be increased according to a minimum value of the target core quantity, the node quantity and the preset core quantity threshold value, and the initial core quantity.

4. The method according to claim 2, wherein the determining a conversion parallelism degree corresponding to the core quantity to be increased according to the core quantity to be increased and the first quantity, comprises:

determining a total increased core quantity according to the core quantity to be adjusted and the first quantity; and determining the conversion parallelism degree according to the node quantity and a ratio of the total increased core quantity to the initial core quantity.

5. The method according to claim 2, wherein the determining a second quantity of the computing nodes to be increased according to the conversion parallelism degree, the parallelism degree to be adjusted and the node quantity, comprises:

determining a difference parallelism degree between the parallelism degree to be adjusted and the conversion parallelism degree; and in a case where the difference parallelism degree is larger than a target threshold value, determining the second quantity of the computing nodes to be increased according to a ratio of the difference parallelism degree to the node quantity.

6. The method according to claim 1, wherein, in a case where the resource adjustment operation comprises a resource reduction operation, the core quantity to be adjusted comprises a core quantity to be reduced, and the computing nodes to be adjusted comprise computing nodes to be reduced;

the determining a core quantity to be adjusted corresponding to central processor units and a second quantity of computing nodes to be adjusted, according to the parallelism degree to be adjusted, the first quantity of the computing nodes that have been created in the service cluster, and the resource utilization rate of the central processor units in each computing node that has been created, comprises:

in a case where the first quantity is larger than a preset quantity, determining a second quantity of the computing nodes to be reduced, according to the parallelism degree to be adjusted and a node quantity of resource nodes in the computing nodes that have been created;

in a case where a difference value between the second quantity of the computing nodes to be reduced and the first quantity is equal to the preset quantity, determining whether the resource utilization rate of the computing nodes that have been created of the preset quantity is less than a third preset threshold value; and in response to the resource utilization rate of the computing nodes that have been created of the preset quantity being less than the third preset threshold value, determining the core quantity to be reduced of the central processor units according to the resource utilization rate, the initial core quantity of the central processor units and a second preset threshold value.

7. The method according to claim 1, wherein the determining resource adjustment information for the service cluster according to a task quantity of streaming data processing tasks to be processed, comprises:

determining a target parallelism degree corresponding to the streaming data processing tasks according to the task quantity;

determining a total original parallelism degree corresponding to the service cluster, according to the first quantity and a node quantity of resource nodes in the computing nodes that have been created; and determining the resource adjustment operation and the parallelism degree to be adjusted, according to a difference value between the target parallelism degree and the total original parallelism degree.

8. An electronic device, comprising:

at least one processor and a memory, wherein the memory stores machine-readable instructions executed by the at least one processor, the at least one processor is configured to execute the machine-readable instructions stored in the memory, and when the machine-readable instructions are executed by the at least one processor, the at least one processor is caused to execute:

determining resource adjustment information for the service cluster according to a task quantity of streaming data processing tasks to be processed, wherein the resource adjustment information comprises a resource adjustment operation that is required to be executed for processing the streaming data processing tasks and a corresponding parallelism degree to be adjusted; the parallelism degree to be adjusted is used to indicate a resource quantity that is required to be adjusted by the service cluster;

determining a core quantity to be adjusted corresponding to central processor units and a second quantity of computing nodes to be adjusted, according to the parallelism degree to be adjusted, a first quantity of the computing nodes that have been created in the service cluster, and a resource utilization rate of central processor units in each computing node that has been created; and executing the resource adjustment operation according to the core quantity to be adjusted and the second quantity, and obtaining a service cluster subject to resource adjusting, wherein the service cluster subject to resource adjusting is used to process streaming data processing tasks under the task quantity.

9. The electronic device according to claim 8, wherein, in a case where the resource adjustment operation comprises a resource scaling-out operation, the core quantity to be adjusted comprises a core quantity to be increased, and the computing nodes to be adjusted comprise computing nodes to be increased;

the determining a core quantity to be adjusted corresponding to central processor units and a second quantity of computing nodes to be adjusted, according to the parallelism degree to be adjusted, the first quantity of the computing nodes that have been created in the service cluster, and the resource utilization rate of the central processor units in each computing node that has been created, comprises:

determining the core quantity to be adjusted of the central processor units, according to the resource utilization rate, an initial core quantity of the central processor units and a node quantity of resource nodes in the computing nodes that have been created;

determining a conversion parallelism degree corresponding to the core quantity to be increased according to the core quantity to be increased and the first quantity; the conversion parallelism degree being used to characterize a parallelism degree that is equivalently increased based on the total original parallelism degree corresponding to the service cluster, after respectively adding the core quantity to be increased to the central processor units in each computing node that has been created; and in a case where the conversion parallelism degree is less than the parallelism degree to be adjusted, determining a second quantity of the computing nodes to be increased according to the conversion parallelism degree, the parallelism degree to be adjusted and the node quantity.

10. The electronic device according to claim 9, wherein the determining the core quantity to be adjusted of the central processor units, according to the resource utilization rate, the initial core quantity of the central processor units and the node quantity of the resource nodes in the computing nodes that have been created, comprises:
- in a case where the initial core quantity is less than a preset core quantity threshold value, determining whether a target resource utilization rate that is larger than a first preset threshold value exists in each resource utilization rate;
- in response to the target resource utilization rate that is larger than the first preset threshold value existing in each resource utilization rate, determining a target core quantity according to the target resource utilization rate, the initial core quantity and a second preset threshold value; and
- determining the core quantity to be increased according to a minimum value of the target core quantity, the node quantity and the preset core quantity threshold value, and the initial core quantity.

11. The electronic device according to claim 9, wherein the determining a conversion parallelism degree corresponding to the core quantity to be increased according to the core quantity to be increased and the first quantity, comprises:
- determining a total increased core quantity according to the core quantity to be adjusted and the first quantity; and
- determining the conversion parallelism degree according to the node quantity and a ratio of the total increased core quantity to the initial core quantity.

12. The electronic device according to claim 9, wherein the determining a second quantity of the computing nodes to be increased according to the conversion parallelism degree, the parallelism degree to be adjusted and the node quantity, comprises:
- determining a difference parallelism degree between the parallelism degree to be adjusted and the conversion parallelism degree; and
- in a case where the difference parallelism degree is larger than a target threshold value, determining the second quantity of the computing nodes to be increased according to a ratio of the difference parallelism degree to the node quantity.

13. The electronic device according to claim 8, wherein, in a case where the resource adjustment operation comprises a resource reduction operation, the core quantity to be adjusted comprises a core quantity to be reduced, and the computing nodes to be adjusted comprise computing nodes to be reduced;
- the determining a core quantity to be adjusted corresponding to central processor units and a second quantity of computing nodes to be adjusted, according to the parallelism degree to be adjusted, the first quantity of the computing nodes that have been created in the service cluster, and the resource utilization rate of the central processor units in each computing node that has been created, comprises:
- in a case where the first quantity is larger than a preset quantity, determining a second quantity of the computing nodes to be reduced, according to the parallelism degree to be adjusted and a node quantity of resource nodes in the computing nodes that have been created;
- in a case where a difference value between the second quantity of the computing nodes to be reduced and the first quantity is equal to the preset quantity, determining whether the resource utilization rate of the computing nodes that have been created of the preset quantity is less than a third preset threshold value; and
- in response to the resource utilization rate of the computing nodes that have been created of the preset quantity being less than the third preset threshold value, determining the core quantity to be reduced of the central processor units according to the resource utilization rate, the initial core quantity of the central processor units and a second preset threshold value.

14. The electronic device according to claim 8, wherein the determining resource adjustment information for the service cluster according to a task quantity of streaming data processing tasks to be processed, comprises:
- determining a target parallelism degree corresponding to the streaming data processing tasks according to the task quantity;
- determining a total original parallelism degree corresponding to the service cluster, according to the first quantity and a node quantity of resource nodes in the computing nodes that have been created; and
- determining the resource adjustment operation and the parallelism degree to be adjusted, according to a difference value between the target parallelism degree and the total original parallelism degree.

15. A non-transient computer-readable storage medium, wherein the non-transient computer-readable storage medium stores computer programs, and when the computer programs are run by an electronic device, the electronic device is caused to execute:
- determining resource adjustment information for the service cluster according to a task quantity of streaming data processing tasks to be processed, wherein the resource adjustment information comprises a resource adjustment operation that is required to be executed for processing the streaming data processing tasks and a corresponding parallelism degree to be adjusted; the parallelism degree to be adjusted is used to indicate a resource quantity that is required to be adjusted by the service cluster;
- determining a core quantity to be adjusted corresponding to central processor units and a second quantity of computing nodes to be adjusted, according to the parallelism degree to be adjusted, a first quantity of the computing nodes that have been created in the service cluster, and a resource utilization rate of central processor units in each computing node that has been created; and
- executing the resource adjustment operation according to the core quantity to be adjusted and the second quantity, and obtaining a service cluster subject to resource adjusting, wherein the service cluster subject to resource adjusting is used to process streaming data processing tasks under the task quantity.

16. The non-transient computer-readable storage medium according to claim 15, wherein in a case where the resource adjustment operation comprises a resource scaling-out operation, the core quantity to be adjusted comprises a core quantity to be increased, and the computing nodes to be adjusted comprise computing nodes to be increased;
- the determining a core quantity to be adjusted corresponding to central processor units and a second quantity of computing nodes to be adjusted, according to the parallelism degree to be adjusted, the first quantity of the computing nodes that have been created in the service cluster, and the resource utilization rate of the central processor units in each computing node that has been created, comprises:

determining the core quantity to be adjusted of the central processor units, according to the resource utilization rate, an initial core quantity of the central processor units and a node quantity of resource nodes in the computing nodes that have been created;

determining a conversion parallelism degree corresponding to the core quantity to be increased according to the core quantity to be increased and the first quantity; the conversion parallelism degree being used to characterize a parallelism degree that is equivalently increased based on the total original parallelism degree corresponding to the service cluster, after respectively adding the core quantity to be increased to the central processor units in each computing node that has been created; and in a case where the conversion parallelism degree is less than the parallelism degree to be adjusted, determining a second quantity of the computing nodes to be increased according to the conversion parallelism degree, the parallelism degree to be adjusted and the node quantity.

17. The non-transient computer-readable storage medium according to claim 16, wherein the determining the core quantity to be adjusted of the central processor units, according to the resource utilization rate, the initial core quantity of the central processor units and the node quantity of the resource nodes in the computing nodes that have been created, comprises:

in a case where the initial core quantity is less than a preset core quantity threshold value, determining whether a target resource utilization rate that is larger than a first preset threshold value exists in each resource utilization rate;

in response to the target resource utilization rate that is larger than the first preset threshold value existing in each resource utilization rate, determining a target core quantity according to the target resource utilization rate, the initial core quantity and a second preset threshold value; and determining the core quantity to be increased according to a minimum value of the target core quantity, the node quantity and the preset core quantity threshold value, and the initial core quantity.

18. The non-transient computer-readable storage medium according to claim 16, wherein the determining a conversion parallelism degree corresponding to the core quantity to be increased according to the core quantity to be increased and the first quantity, comprises:

determining a total increased core quantity according to the core quantity to be adjusted and the first quantity; and determining the conversion parallelism degree according to the node quantity and a ratio of the total increased core quantity to the initial core quantity.

19. The non-transient computer-readable storage medium according to claim 16, wherein the determining a second quantity of the computing nodes to be increased according to the conversion parallelism degree, the parallelism degree to be adjusted and the node quantity, comprises:

determining a difference parallelism degree between the parallelism degree to be adjusted and the conversion parallelism degree; and in a case where the difference parallelism degree is larger than a target threshold value, determining the second quantity of the computing nodes to be increased according to a ratio of the difference parallelism degree to the node quantity.

20. The non-transient computer-readable storage medium according to claim 15, wherein in a case where the resource adjustment operation comprises a resource reduction operation, the core quantity to be adjusted comprises a core quantity to be reduced, and the computing nodes to be adjusted comprise computing nodes to be reduced;

the determining a core quantity to be adjusted corresponding to central processor units and a second quantity of computing nodes to be adjusted, according to the parallelism degree to be adjusted, the first quantity of the computing nodes that have been created in the service cluster, and the resource utilization rate of the central processor units in each computing node that has been created, comprises:

in a case where the first quantity is larger than a preset quantity, determining a second quantity of the computing nodes to be reduced, according to the parallelism degree to be adjusted and a node quantity of resource nodes in the computing nodes that have been created;

in a case where a difference value between the second quantity of the computing nodes to be reduced and the first quantity is equal to the preset quantity, determining whether the resource utilization rate of the computing nodes that have been created of the preset quantity is less than a third preset threshold value; and in response to the resource utilization rate of the computing nodes that have been created of the preset quantity being less than the third preset threshold value, determining the core quantity to be reduced of the central processor units according to the resource utilization rate, the initial core quantity of the central processor units and a second preset threshold value.

* * * * *